US008985448B2

(12) United States Patent
Jonely

(10) Patent No.: US 8,985,448 B2
(45) Date of Patent: Mar. 24, 2015

(54) INTEGRATED ANTENNA COIL IN A METALLIC BODY

(71) Applicant: Master Lock Company, Oak Creek, WI (US)

(72) Inventor: Michael B. Jonely, Whitewater, WI (US)

(73) Assignee: Master Lock Company LLC, Oak Creek, WI (US)

( * ) Notice: Subject to any disclaimer, the term of this patent is extended or adjusted under 35 U.S.C. 154(b) by 10 days.

(21) Appl. No.: 13/830,393

(22) Filed: Mar. 14, 2013

(65) Prior Publication Data

US 2014/0027507 A1 Jan. 30, 2014

Related U.S. Application Data

(60) Provisional application No. 61/675,589, filed on Jul. 25, 2012.

(51) Int. Cl.
G06K 7/04 (2006.01)
G07C 9/00 (2006.01)
G06K 19/07 (2006.01)

(52) U.S. Cl.
CPC ........ *G07C 9/00658* (2013.01); *G06K 19/0723* (2013.01); *G07C 9/00944* (2013.01)
USPC .............................. 235/444; 340/5.2; 70/278.1

(58) Field of Classification Search
USPC .............. 235/439, 444, 450; 340/5.2; 70/277, 70/278.1
See application file for complete search history.

(56) References Cited

U.S. PATENT DOCUMENTS

| | | |
|---|---|---|
| 5,274,353 A | 12/1993 | Bianchi |
| 5,428,214 A | 6/1995 | Hakkers et al. |
| 5,463,407 A | 10/1995 | West et al. |
| 5,632,168 A | 5/1997 | Yano |
| 5,668,563 A | 9/1997 | Ogino et al. |
| 5,870,915 A | 2/1999 | D'Hont |
| 6,317,046 B1 | 11/2001 | Fresnel et al. |
| 7,088,249 B2 * | 8/2006 | Senba et al. ............... 340/572.8 |
| 2003/0164800 A1 | 9/2003 | Jordan et al. |
| 2004/0174247 A1 * | 9/2004 | Rodenbeck et al. ......... 340/5.64 |
| 2006/0226948 A1 * | 10/2006 | Wright et al. ................ 340/5.25 |
| 2006/0230796 A1 | 10/2006 | Keller et al. |
| 2007/0241200 A1 | 10/2007 | Sawachi |
| 2009/0140837 A1 | 6/2009 | Jennings |
| 2010/0039336 A1 | 2/2010 | Yasin et al. |
| 2010/0073247 A1 * | 3/2010 | Arkko et al. .................. 343/745 |
| 2013/0196787 A1 * | 8/2013 | Luciano et al. ............... 473/371 |

OTHER PUBLICATIONS

International Search Report and Written Opinion for PCT Application No. PCT/US2013/031679, mail date May 23, 2013, 11 pages.

* cited by examiner

*Primary Examiner* — Christle I Marshall
(74) *Attorney, Agent, or Firm* — Foley & Lardner LLP

(57) ABSTRACT

Locking devices, electronic locks, and detection assemblies are provided. One locking device includes an antenna and a conductive body having a cavity disposed around the antenna and formed in an interior portion of the conductive body. The conductive body further includes a slot extending from the cavity to an outer surface of the conductive body.

21 Claims, 7 Drawing Sheets

INTEGRATED ANTENNA COIL IN A METALLIC BODY

CROSS-REFERENCE TO RELATED APPLICATIONS

The present application claims the benefit of U.S. Provisional Patent Application Ser. No. 61/675,589, filed Jul. 25, 2012, titled "Integrated Antenna Coil in a Metallic Body," which is incorporated herein by reference in its entirety.

BACKGROUND

The present disclosure relates generally to antenna coils embedded in metallic structures, including security devices and, more specifically, to radio-frequency identification (RFID) and/or near field communication (NFC) locks.

Security devices, such as padlocks and other types of locks, are used to prevent access to a room, building, container, or piece of equipment. Some locks include keyed locks or combination locks. To open those locks, the user utilizes a key to open the lock or a combination of numbers, symbols, codeword, etc. to open the lock. Such devices may be used because the lock can be a constructed primarily from metallic or other durable and tamper resistant materials. Thus, it may be less likely that the lock will be damaged or broken, either due to the elements or due to attempts at breaking the lock.

RFID systems allow for convenient wireless identification and tracking of people and/or objects for various types of applications. For example, RFID systems may be used in access control applications, such as allowing users to access protected areas by holding an RFID card within proximity of a card reader coupled to a door lock. Other example applications of RFID systems include tracking products (e.g., in a retail environment), tracking people in a hospital environment, or enabling users to wirelessly process payments (e.g., using a wireless point-of-sale RFID detection system).

An RFID detection system can identify an RFID device (e.g., an RFID tag or card) when the detection system detects that the RFID device has entered the proximity of the detection system. One way to detect when an RFID device has come within proximity of the detection system is to continuously keep the detection system in an active polling mode. In the active polling mode, the detection system transmits polling signals that RFID devices within proximity of the detection system can receive. The RFID devices may then respond to the polling signals, indicating to the detection circuit that the devices are within proximity of the detection circuit and that an identification determination should be made by the detection circuit with respect to the devices.

RFID detection systems and RFID access cards have been used in buildings to substantially prevent unauthorized access to various rooms unless an authorized access card is presented to a corresponding RFID detection system. Such readers tend to include an antenna coil and a pc board that has been potted with a non-metallic, electrically nonconductive resin material inside of a non-metallic, nonconductive, plastic housing. NFC communicative devices, such as NFC capable cell phones, tend to cover the NFC antenna with a non-metallic, nonconductive cover.

SUMMARY

One embodiment relates to a locking device including an antenna and a conductive body having a cavity disposed around the antenna and formed in an interior portion of the conductive body. The conductive body further includes a slot extending from the cavity to an outer surface of the conductive body.

Another embodiment relates to an electronic lock including a lock assembly and a detection system associated with the lock assembly. The detection system includes a processing circuit and a detection circuit having an antenna. The detection system is operable to actuate the lock assembly in response to data from the processing circuit representative of an authorized access. The electronic lock further includes a body including a conductive body disposed about the antenna. The conductive body includes a longitudinal slot extending along at least a portion of the conductive body. The body further includes a front conductive portion having a vertical slot. The front conductive portion is in electrical communication with the conductive body, and the vertical slot and the longitudinal slot are substantially coplanar.

Yet another embodiment relates to a detection assembly including a detection system that includes an antenna. The detection assembly further includes a body that includes a conductive body disposed about the antenna and a front conductive portion having a vertical slot. The conductive body includes a longitudinal slot extending along at least a portion of the conductive body. The front conductive portion is in electrical communication with the conductive body, and the vertical slot and the longitudinal slot are substantially coplanar. An RF current is generated about the vertical slot when the antenna disposed within the conductive body emits an RF signal.

Yet another embodiment relates to an electronic lock including a lock assembly and a detection system associated with the lock assembly. The detection system includes an antenna and is operable to detect at least one of an RFID and an NFC device. The detection system is operable to actuate the lock assembly in response to a detection of at least one of an authorized RFID and an authorized NFC device. The electronic lock further includes a body that includes a substantially cylindrical conductive body disposed about the antenna and a front conductive portion having a vertical slot. The substantially cylindrical conductive body includes a longitudinal slot extending along at least a portion of the substantially cylindrical conductive body. The front conductive portion is in electrical communication with the substantially cylindrical conductive body, and the vertical slot and the longitudinal slot are substantially coplanar. The antenna and the at least one of the RFID device and NFC device are in communication via an RF current generated about the vertical slot.

In various implementations of the embodiments described herein, the cavity may be substantially cylindrical, octagonal, have a square cross-section, have a rectangular cross-section, have a symmetrical cross-section, have an asymmetrical cross-section, have one or more sides, and/or have a complementary cross-section to a cross-section of the antenna.

In some implementations, the antenna may be disposed about a non-conductive body, and the conductive body may have a complementary cross-section to a cross-section of the non-conductive body.

In some implementations, the conductive body may be in communication with a ferrite portion.

In some implementations, the vertical slot or the horizontal slot may be filled with a non-conductive material.

In some implementations, the detection system may be operable to detect at least one of an RFID device and NFC device.

BRIEF DESCRIPTION OF THE DRAWINGS

Like reference numbers and designations in the various drawings indicate like elements.

DETAILED DESCRIPTION

Figure 1:
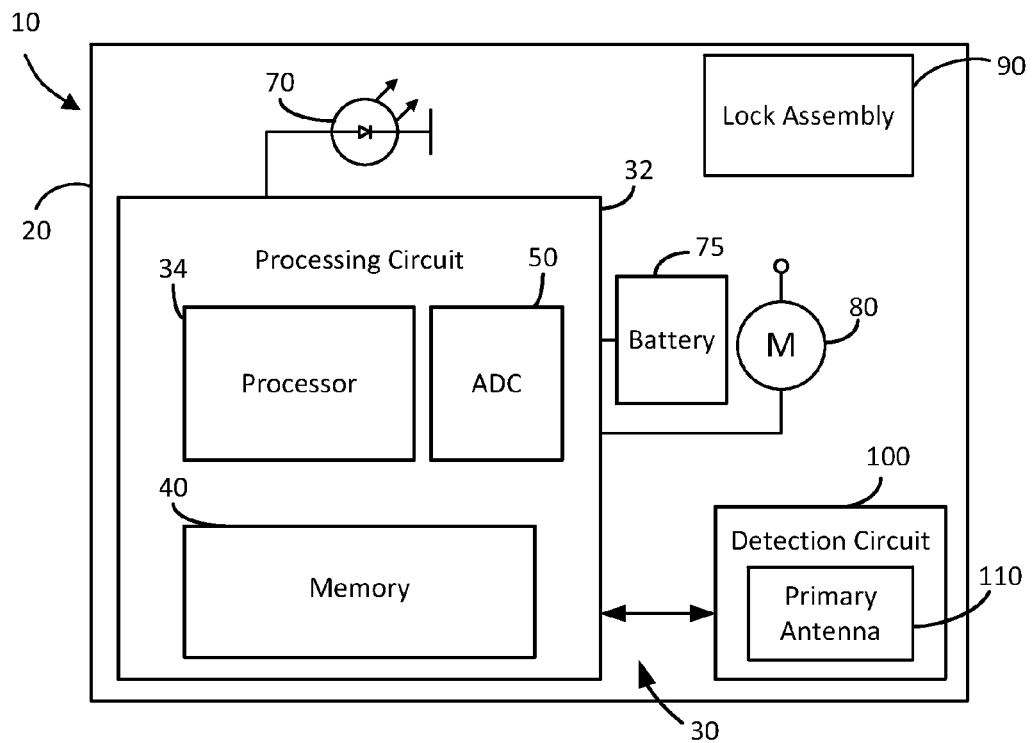
FIG. 1 is a block diagram of a lock operated having a detector according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

I. Overview

Referring generally to the figures, systems and methods for embedding an antenna in a metallic body and uses for such embedded antennas are shown and described. In some instances, positioning a coil antenna on the surface of a metallic body may result in an effective RF short to the antenna, thereby rendering the antenna less effective. In other instances, positioning the antenna on the interior of an enclosed metallic body may render the antenna less effective due to the metallic body operating as an electromagnetic shield, thereby limiting or isolating the signal within the metallic body. Further, in some instances, generally positioning the antenna coil near metallic objects may result in stray capacitance that may detune the antenna. For example, the stray capacitance may shift the resonant frequency of the antenna away from the design frequency. In some instances, a plastic or other nonconductive cover may be utilized to avoid these issues. However, such covers may be susceptible to damage from the environment or from tampering. Accordingly, positioning an antenna within a metallic body while maintaining its effectiveness may be useful to the design of a RFID or NFC padlock or other security device.

One example of a configuration for an antenna within a metallic body utilizes the design of the metallic body to transfer the magnetic field generated by the primary coil of the antenna to the exterior surface of the metallic body (and thereafter allowing magnetic coupling to an RFID or NFC device). For example, the metallic body may include an interior substantially cylindrical surface having a longitudinal slit or gap extending along the length of the substantially cylindrical surface. The antenna located within the substantially cylindrical surface generates a current on the substantially cylindrical surface when the antenna is active. The gap in the surface permits a voltage to form across the gap, which generates current on the exterior of the metallic body. The current on the exterior surface generates a magnetic field that may facilitate communication with an RFID or NFC device (e.g., a nearby RFID card). A slot on the front of the metallic body may define the path of the current flow on the exterior surface of the metallic body. In some implementations, the metallic body may provide an electrostatic shield for the antenna located within the metallic body, thereby potentially reducing the effects of stray capacitance of nearby metallic objects on the antenna. In some implementations, a ferrite disc may be positioned at the rear end of the antenna, opposite the front slot, between an enclosed rear end of the metallic body and the antenna. The ferrite disc may provide additional impedance to the antenna, which may compensate, at least in part, for lost voltage from the enclosed rear end of the metallic body. A nonconductive, durable material may be filled into the longitudinal and vertical slots of the metallic body, thereby sealing the antenna within the metallic body.

The configurations described herein may be incorporated into a padlock or door lock, thereby allowing the usage of an RFID or NFC detection system while providing a substantially solid body that may resist wear from the elements or attempts to tamper with the lock. Of course other implementations may utilize such a configuration, including, but not limited to, an electronic safe (e.g., a small document safe, a weapon storage safe, or an electronic keysafe), an electronic rim or mortise lock or other type of cabinet lock, an electronic auto accessory lock (e.g., a coupler lock, a hitch pin lock, a trailer lock, etc.) and/or a steering wheel or door lock for an automobile, a vehicle lock (e.g., a wheel lock or ignition lock) for other motorized or non-motorized vehicles such as a bicycle, a motorcycle, a scooter, an ATV, and/or a snowmobile, a storage chest, a case with an electronic lock (e.g., a document case or a case for small valuables), an electronic cable lock (e.g., a cable lock enabled with an alarm, such as for securing a computing device), a safety lockout/tagout device for securing access for safety purposes (e.g., for securing an electrical control box while electrical work is being performed), a locker with an electronic lock, an electronic luggage lock, and/or the like. In some embodiments, any device may utilize the configurations described herein to use a metal body to transmit and/or receive data, regardless of whether or not the device includes a locking device.

FIG. 1 depicts a block diagram of an example of an electronic lock 10 into which a detection circuit 100 associated with a detection system 30 may be implemented. Lock 10 includes a battery 75 that provides electrical power to components of lock 10. Detection circuit 100 may include an RFID or NFC detector, as will be described in greater detail below. Lock 10 of the present example includes a body 20 which may house an example detection system 30 and a lock assembly 90. Lock assembly 90 may comprise a padlock assembly, a deadbolt or door lock assembly, and/or other lock assemblies as will be apparent to one of ordinary skill in the art in view of the teachings herein. In some implementations, lock assembly 90 may be associated with body 20 and detection system 30, but may be located at a position that is remote from body 20. For example, body 20 housing detection system 30 may be located at one position on a door while lock assembly 90 is at a different location relative to body 20 (e.g., vertical rod locks, etc.).

Lock assembly 90 is associated with a motor 80 that is in electrical communication with detection system 30 such that detection system 30 may operate motor 80 to disengage lock assembly 90 from a locked state when a detection circuit 100 detects the presence of an authorized RFID or NFC device. In some implementations, motor 80 may be utilized to reengage lock assembly 90 to a locked position. For example, a timing circuit may be coupled to motor 80 such that the direction of motor is reversed to reengage lock assembly 90 once a predetermined time has occurred. In other instances, motor 80 may be triggered to reengage once detection circuit 100 detects the authorized RFID or NFC device a second time. In some implementations a switch (not shown) may be associated motor 80 such that a protrusion or other mechanical feature of motor may trigger the switch. The switch may be used to stop the rotation of motor 80 once lock assembly 90 has been disengaged or reengaged. In some implementations, other mechanical devices may be utilized in addition to, or instead of, motor 80, for example, a miniature solenoid, a Micro-Electro-Mechanical System (MEMS) actuator, and/or the like. Of course further configurations for motor 80 and/or lock assembly 90 will be apparent to one of ordinary skill in the art in view of the teachings herein.

An LED 70 may also be associated with detection system 30 such that a visual indicator may be provided. For example, LED 70 may be utilized to indicate when an acceptable RFID or NFC device has successfully unlocked lock 10 by emitting a solid light to indicate that motor 80 is operating to disengage lock assembly 90. In some implementations, LED 70 may provide a visual indicator of the status of detection system 30. For example, if a power source (e.g., battery or otherwise) is incorporated into detection system 30, LED 70 may provide a visual indicator when the power source is substantially exhausted and should be replaced (e.g., a blinking light). In some instances, LED 70 may indicate that the power source may need to be recharged, for example a lock 10 intended for outdoor use may incorporate one or more solar cells to provide power or recharge an internal power source. Of course one or more LEDs 70 may be used or LED 70 may be omitted entirely.

Detection system 30 of the present example includes a processing circuit 32 in circuit communication with a detection circuit 100. Processing circuit 32 includes a processor 34, which may be any type of general purpose or special purpose microprocessor (e.g., FPGA, CPLD, ASIC, etc.). Processing circuit 32 also includes a memory 40, which may include any type of computer- or machine-readable, non-transitory storage medium (e.g., RAM, ROM, EEPROM, flash memory, etc.). Processing circuit 32 may further include an analog-to-digital controller (ADC) circuit 50 configured to receive the analog voltage signal from detection circuit 100 and to convert the analog voltage signal into a digital signal that can be interpreted and manipulated by processing circuit 32. Memory 40 may include modules including instructions that, when executed by processor 32, cause processor 32 to perform functions that may be used in detecting the presence of an RFID or NFC device. Of course the foregoing is merely an example, and other configurations for processing circuit 32 may be apparent to one of ordinary skill in the art in view of the teachings herein. For example, in some implementations, one or more functions of detection system 30 may be performed analog circuitry in lieu of a microprocessor.

Detection circuit 100 is in communication with processing circuit 32 and includes a primary antenna 110 configured generate radio-frequency signals to interact with an RFID or NFC device. In some implementations, detection circuit 100 may operate in an active polling mode in which polling signals are periodically transmitted by primary antenna 110 to RFID or NFC devices that may come near lock 10. In other implementations, detection circuit 100 may operate in a low-power, "sleep" mode when an RFID device is not within proximity of lock 10 and an active mode to communicate with nearby RFID devices once an RFID device is detected during the low-power, "sleep" mode. When an RFID or NFC device is detected by detection circuit 110 and determined to be authorized by processing circuit 32, locking assembly 90 is disengaged and lock 10 may be opened and removed to provide access to the secured object.

II. Example Embedded Antenna

In some instances, body 20 may be formed of a nonconductive material so as to not interfere with the operation of primary antenna 110. However, in some instances, such as a lock or other security device, it may be desirable to encase detection system 30 and/or portions of lock assembly 90 within a metallic body 20. Encasing primary antenna 110 within a metallic body 20 may result in an effective RF short to antenna 110 reducing its effectiveness, electromagnetically shielding antenna 110 within body 20 that may limit or isolate the signal of antenna 110, and/or introducing stray capacitance that may detune antenna 110 by shifting the resonant frequency of antenna 110 from the design frequency. Accordingly, for antenna 110 to interact with RFID or NFC devices outside of a metallic body 20 (and thus outside of lock 10), it may be useful to configure the metallic body 20 in such a way as to transmit the RF signal generated by antenna 110 from the interior of body 20 to the exterior of body 20 by inducing RF current on the exterior of body 20.

Figure 2:
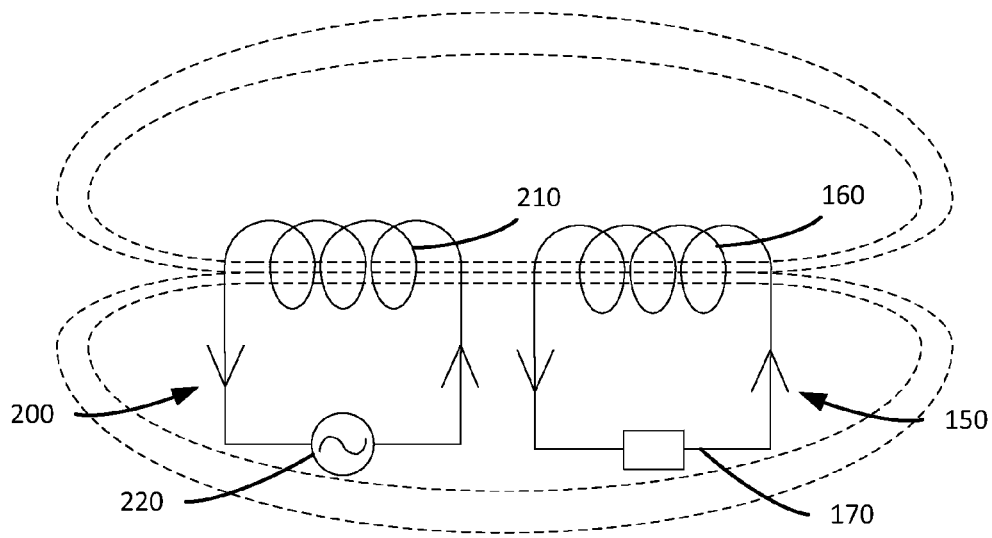
FIG. 2 is a circuit diagram of a pair of coils forming a transformer according to an exemplary embodiment.
Figure 3:
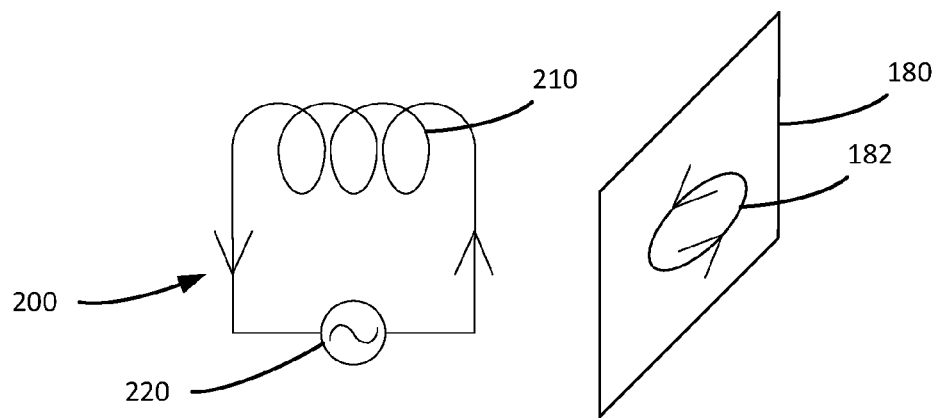
FIG. 3 is a perspective view of an RFID device and a conductive plate having induced current according to an exemplary embodiment.
Figure 4:
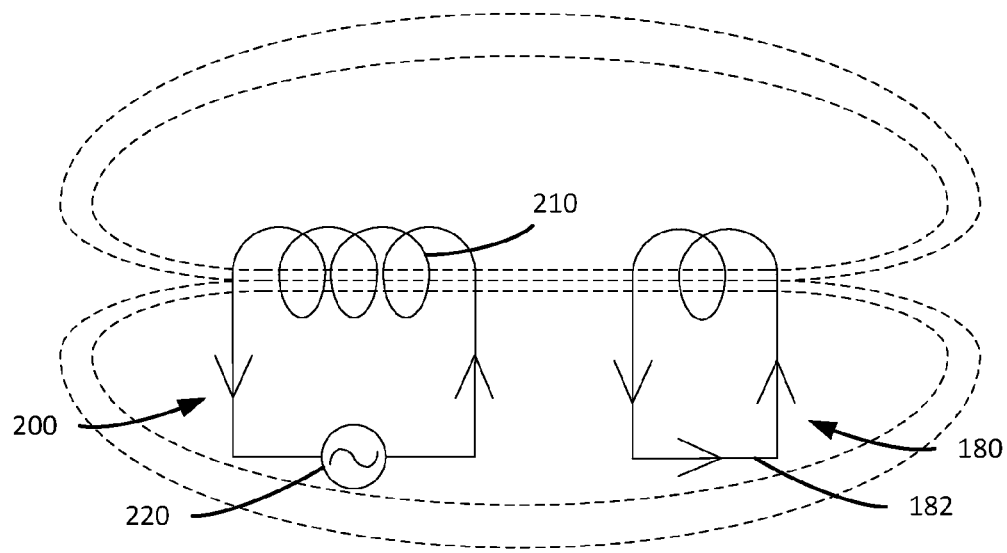
FIG. 4 is a circuit diagram of the RFID device and conductive plate of FIG. 3 according to an exemplary embodiment.

Referring to FIG. 2, a primary antenna 200 having a primary coil 210 coupled to a source of RF current 220, such as detection circuit 100 described above, is shown inducing a current 170 in a second antenna 150 having a second coil 160. Primary coil 210 and second coil 160 are coupled due to mutual inductance and form a basic air core transformer. Referring to FIG. 3, when primary antenna 200 is near a conductive body, such as conductive plate 180, primary antenna 200 induces a current, such as current 182, in the conductive body. In the example shown, conductive plate 180 acts as an RF short that renders primary coil 210 less effective. As shown in FIG. 4, this can be modeled as a shorted single turn formed by the conductive surface of conductive plate 180 that is parallel to the to primary coil 210. Due to the shorting by conductive plate 180, primary antenna 200 is also shorted and the severity of the short depends on the coupling coefficient between primary antenna 200 and conductive plate 180. The coupling coefficient is determined by the magnitude of the mutual inductance between primary antenna 200 and conductive plate 180. Of course conductive plate 180 is an example and other conductive bodies may cause an RF short in primary antenna 200 as well.

In addition, in some instances when primary antenna 200 is within a conductive body, the conductive body operates as an electromagnetic shield due to the skin effect. The skin effect is the tendency of alternating current, such as that used to generate an RF current, to be distributed along an upper portion, or skin, of the conductor. Thus, if primary antenna 200 is within a conductive body, such as if a number of conductive plates 180 encased primary antenna 200, then the RF current induced on the conductive plates 180 would not penetrate through the conductive plates 180, thereby isolating the RF signal within.

Figure 5:
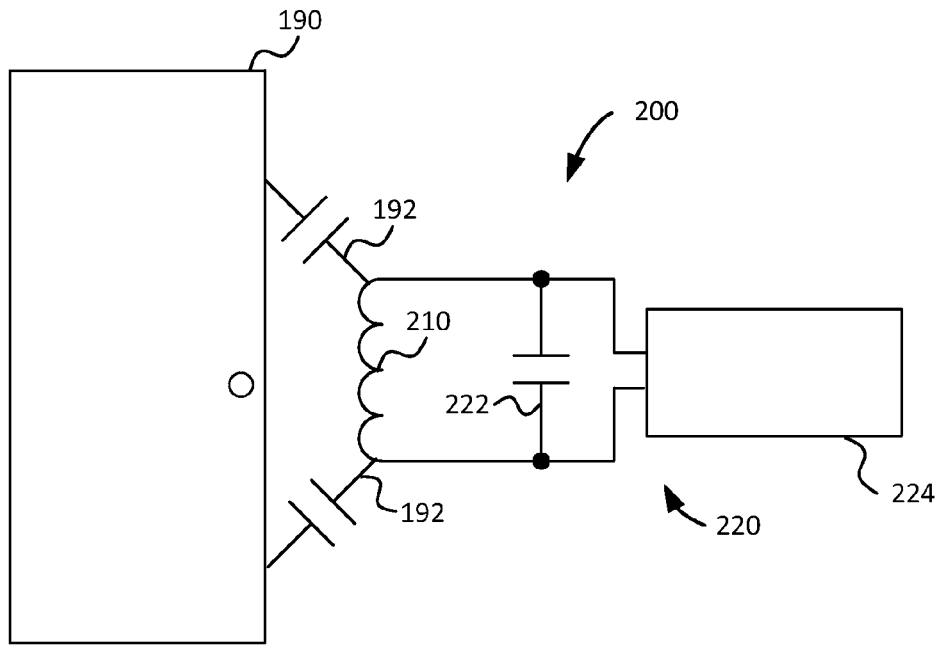
FIG. 5 is a block diagram of an RFID device and a conductive door in proximity to a coil of the RFID device according to an exemplary embodiment.
Figure 6:
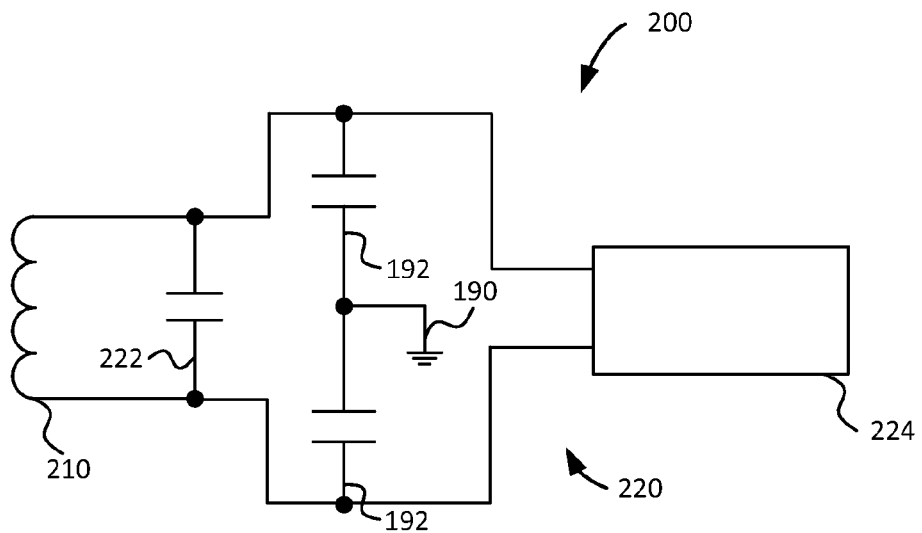
FIG. 6 is an equivalent circuit diagram of the RFID device and conductive door of FIG. 5 according to an exemplary embodiment.

FIGS. 5-6 illustrate the effect of stray capacitance on the resonant frequency of the primary antenna 200. In some instances, when primary antenna 200 is near a conductive body, such as a metallic door 190, the conductive body may result in stray capacitance that may detune primary antenna 200 by shifting the resonant frequency from the design frequency of the RFID or NFC system. As shown in FIG. 5, primary antenna 200 may include primary coil 210 having an inductance $L_{ant}$, a resonating capacitor 222 with a capacitance $C_{res}$, and an RFID or NFC transmitter and/or receiver 224. In some instances, primary antenna 200 may have a design resonant frequency of 13.56 MHz defined by the expression:

$$\frac{1}{2\pi\sqrt{L_{ant}C_{res}}}$$

For primary antennas 200 in controlled environments, such as an RFID reader for building access, primary antenna 200 may encounter few, if any, conductive bodies that would disturb the resonant frequency. However, in other environments where primary antenna 200 may encounter conductive bodies, for instance a primary antenna 200 in a lock may be introduced to a wide variety of environments, the conductive bodies may result in stray capacitance that alters the resonant frequency. When primary antenna 200 is near a conductive body, such as door 190, stray capacitance $C_{stray}$, represented by capacitors 192, may be introduced. This stray capacitance is shown in a simplified circuit diagram in FIG. 6. As a result, the resonant frequency is now defined by the equation:

$$\frac{1}{2\pi\sqrt{L_{ant}\left(C_{res}+\frac{C_{stray}}{2}\right)}}$$

Thus, because $L_{ant}$ and $C_{res}$ remain constant, the introduction of $C_{stray}$ results in a change in the resonant frequency. When the resonant frequency is shifted away from the design frequency of the system, the antenna coupling efficiency is rapidly deteriorated and decreases the read range of primary antenna 200.

Figure 7:
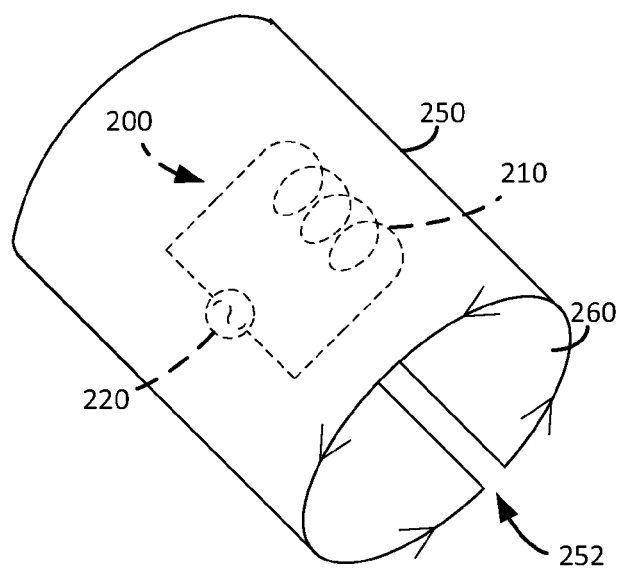
FIG. 7 is a perspective view of an antenna in a substantially cylindrical opening having a slot according to an exemplary embodiment.
Figure 8:
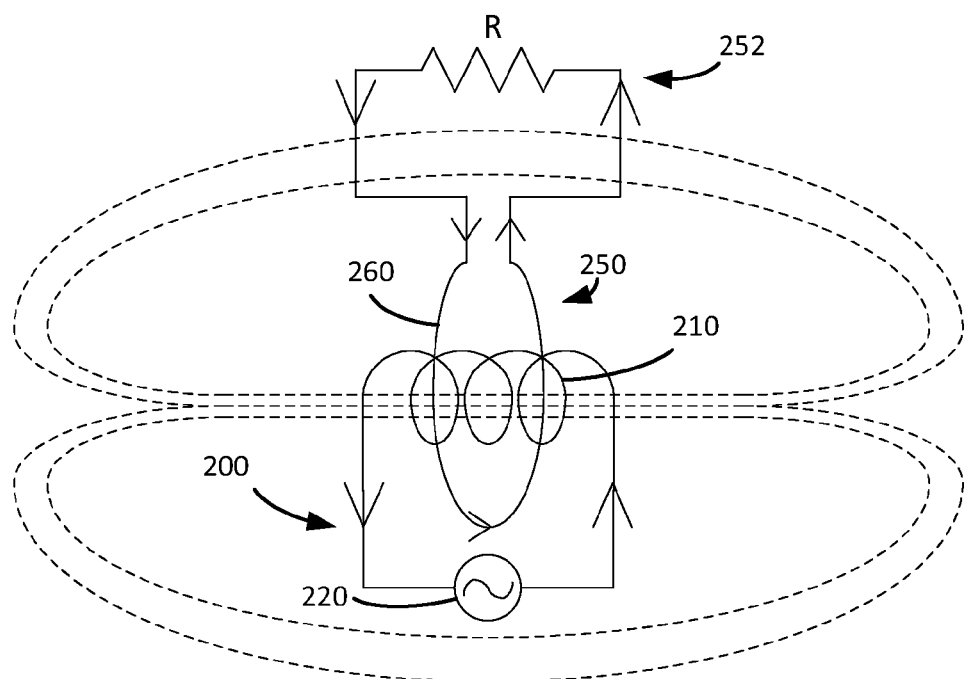
FIG. 8 is a circuit diagram of the antenna and the substantially cylindrical opening of FIG. 7 according to an exemplary embodiment.

An example of primary antenna 200 and a simplified body 250 are depicted in FIGS. 7-8. Referring to FIG. 7, primary antenna 200 (shown in phantom) is positioned within body 250. Primary antenna 200 of this example is shown with primary coil 210 that is coupled to RF current source 220, for example, detection circuit 100 described above. Body 250 comprises a substantially cylindrical metallic body having a longitudinal slot 252 extending along the length of the cylindrical body. The mutual inductance between primary coil 210 and an interior surface 260 of body 250 permits RF current to be induced on interior surface 260 due to the skin effect, discussed above. The induced RF current on interior surface 260 permits an RF voltage to exist across longitudinal slot 252.

Referring briefly to FIG. 8, a simplified circuit diagram of primary antenna 200 and interior surface 260 of body 250 are shown with a resistor R representing the load of impedance of free space across longitudinal slot 252. Interior surface 260 is represented as a single turn about primary coil 210 of antenna 200. The magnetic flux generated by primary coil 210 forms a basic transformer with interior surface 260 and induces RF current on interior surface 260. The induced current on interior surface 260 results in an RF voltage being formed across longitudinal slot 252.

Figure 10:
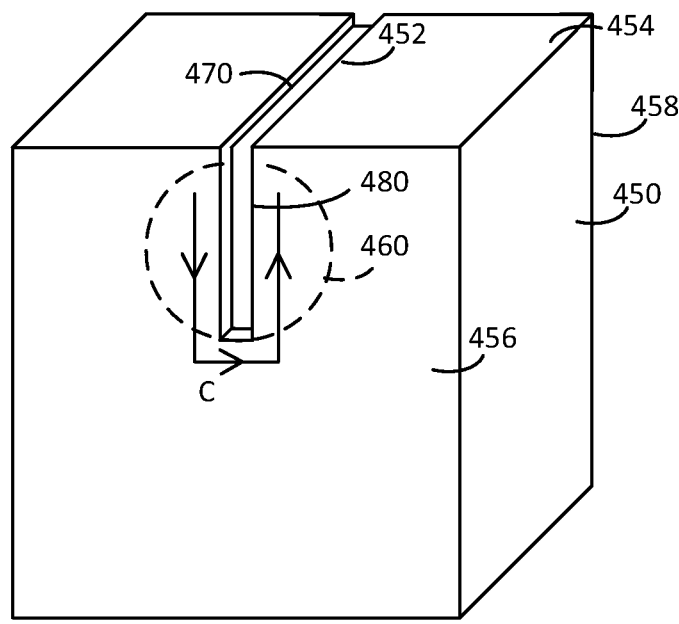
FIG. 10 is a front perspective view of an antenna encased in a body having a front slot according to an exemplary embodiment.

Referring back to FIG. 7, the RF voltage across longitudinal slot 252 generates an RF current on the exterior of body 250 to form the magnetic field that communicates with an RFID or NFC device near body 250. The path of the current on the exterior of body 250 may depend on the shape and configuration of the exterior of body 250. For example, as will be described in greater detail below, a thin slot on a front face 456 of a body 450, shown in FIG. 10, defines a current path C. In some instances, locating primary coil 210 within body 250 may provide an electrostatic shield to primary coil 210, thereby reducing potential detuning effects due to stray capacitance of metallic objects near body 250 while still permitting efficient magnetic coupling with an RFID or NFC device.

Figure 9:
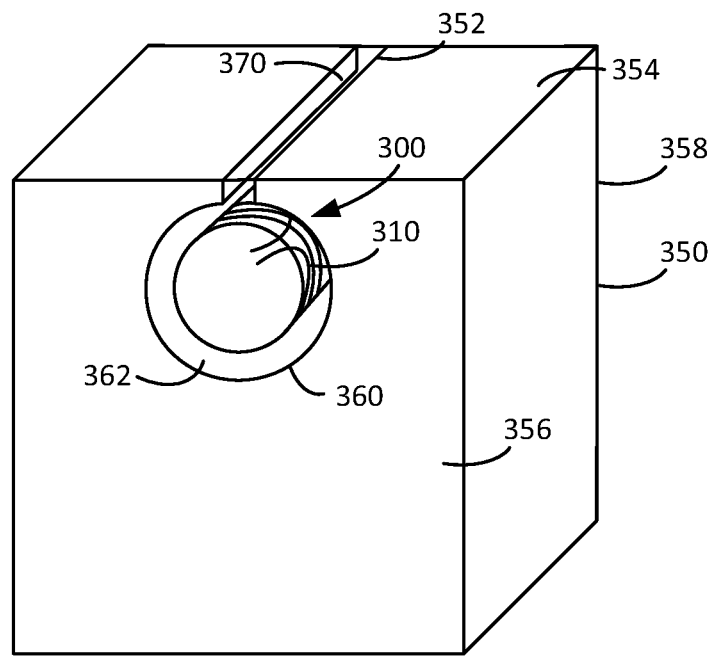
FIG. 9 is a front perspective view of an antenna encased in a body according to an exemplary embodiment.

Referring to FIG. 9, an example of an implementation of the foregoing antenna and body described in reference to FIGS. 7-8 is shown. As shown, an antenna 300 having a primary coil 310 wrapped around a nonconductive cylinder 320 (e.g., a plastic cylinder, a PVC pipe, or the like) is positioned within a cylindrical opening 360 in a body 350. Cylinder 320 is merely present to mechanically maintain the shape of primary coil 310 and to secure primary coil 310 within body 350 and, in some instances, may be omitted. In addition, cylinder 320 is merely an example body about which primary coil 310 may be formed and it should be understood that other geometries may be used, for example a cuboid, octagonal body, pentagonal body, triangular body, hexagonal body, heptagonal body, symmetrical body, asymmetrical body, etc. In some versions, primary coil 310 may include 1 turn, inclusive, to 100 turns, inclusive, about a ¾ inch nonconductive PVC cylinder 320. In some versions, primary coil 310 may include 1 turn, inclusive, to 50 turns, inclusive, about a nonconductive cylinder 320. In some versions, primary coil 310 may include 1 turn, inclusive, to 25 turns, inclusive, about a nonconductive cylinder 320. In some versions, primary coil 310 may include 7 turns, inclusive, to 11 turns, inclusive, about a nonconductive cylinder 320. Of course other numbers of turns may be used.

Figure 13:
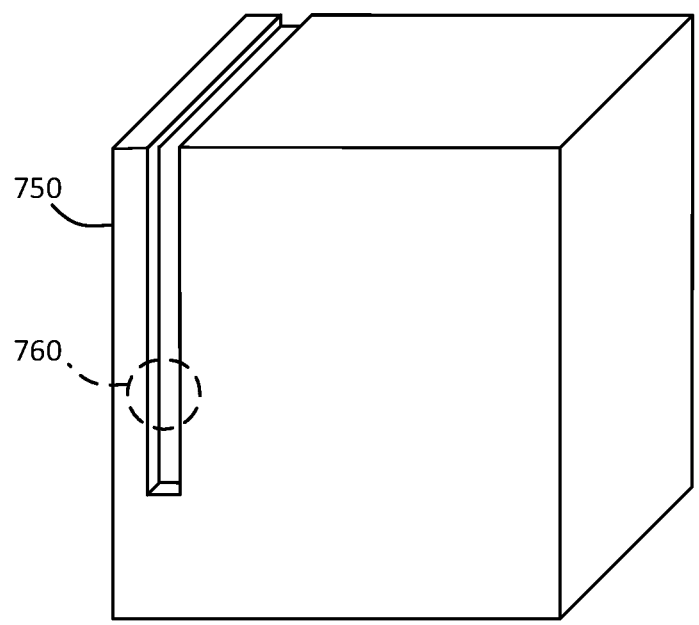
FIG. 13 is a front perspective view of an antenna encased in a body having a front slot according to an exemplary embodiment.

Body 350 may comprise a conductive block. For example, body 350 may include a block having a width of 3 inches, a depth of 2 inches, and a height of 1.5 inches. In another version, body 350 may include a block having a width and depth of 2.5 inches and a height of 1.25 inches. Of course other sized bodies 350 may be used. Body 350 includes a longitudinal cylindrical opening 360 extending through body 350 and sized to house primary coil 310 and, optionally, cylinder 320 therein. Similar to cylinder 320, cylindrical opening 360 may have other geometric configurations, such as rectangular openings, square openings, octagonal openings, pentagonal openings, triangular openings, hexagonal openings, heptagonal openings, symmetrical openings, asymmetrical openings, etc. In some versions, cylindrical opening 360 may have a diameter of 1 inch. Of course other sized openings 360 may be used. It should be further understood that opening 360 may be positioned at any other position of body 350, such as near a corner of body 350, offset from a centerline, etc. For example, one such alternative positioning of opening 360 is shown offset as opening 760 (shown in phantom) formed in body 750 shown in FIG. 13. Of course other positions for openings 360, 760 may be implemented.

In some versions, a separate cylinder may be inserted into a solid block with antenna 300 therein. Cylindrical opening 360 defines an interior surface 362 of body 350 that is substantially similar to interior surface 260 described above. Body 350 further includes a longitudinal slot 352 formed in a top surface 354 of body 350. Longitudinal slot 352 is positioned tangentially along cylindrical opening 360 and extends substantially along the length of cylindrical opening 360 from a front face 356 to a rear face 358 of body 350. In some versions, longitudinal slot 352 may be 3/16 inches in width, though other dimensions may be used. In the configuration shown in FIG. 9, when primary coil 310 is excited with RF current, the mutual inductance between primary coil 310 and interior surface 362 of body 350 permits RF current to be induced on interior surface 362 due to the skin effect described above. The induced RF current on interior surface 362 permits an RF voltage to develop across longitudinal slot 352. The RF voltage across longitudinal slot 352 generates an RF current on the exterior of body 350 to form the magnetic field that communicates with an RFID or NFC device near body 350. In some instances, a nonconductive, durable material 370, such as a potting material, may be used to fill in longitudinal slot 352 and/or cylindrical opening 360 to enclose primary coil 310 of antenna 300 within body 350.

In some implementations, it may be useful to enclose the front and/or rear of the body to encase the antenna, primary coil, and/or other items within the body and/or for other purposes. For example, referring to FIG. 10, a front perspective view of a body 450 is shown having a longitudinal cylindrical opening 460 (shown in phantom) that is covered by metallic portion having a vertical slot 480 formed in a front face 456 of body 450. Similar to body 350, longitudinal cylindrical opening 460 extends longitudinally within body 450 and is sized to house a primary coil (not shown) therein. Cylindrical opening 460 defines an interior surface (not shown) of body 450 that is substantially similar to interior surfaces 260, 362 described above. Body 450 further includes a longitudinal slot 452 formed in a top surface 454 of body 450. Longitudinal slot 452 is positioned tangentially along cylindrical opening 460 and extends substantially along the length of cylindrical opening 460 from a front face 456 to a rear face 458 of body 450. The mutual inductance between the primary coil and the interior surface of body 450 permits RF current to be induced on the interior surface due to the skin effect when the primary coil is excited with RF current. The induced RF current on the interior surface develops an RF voltage across longitudinal slot 452. The RF voltage across longitudinal slot 452 generates an RF current C on the exterior of body 450 that is defined by vertical slot 480. This effectively makes the portion of front face 456 having vertical slot 480 an extension of the antenna contained within body 450. A magnetic field is generated by the RF current C on front face 456 that can be used to communicate with an RFID or NFC device near body 450. In some instances, a nonconductive, durable material 470, such as a potting material, may be used to fill in longitudinal slot 452, cylindrical opening 460, and/or vertical slot 480 to enclose the antenna and/or other components within body 450.

Figure 11:
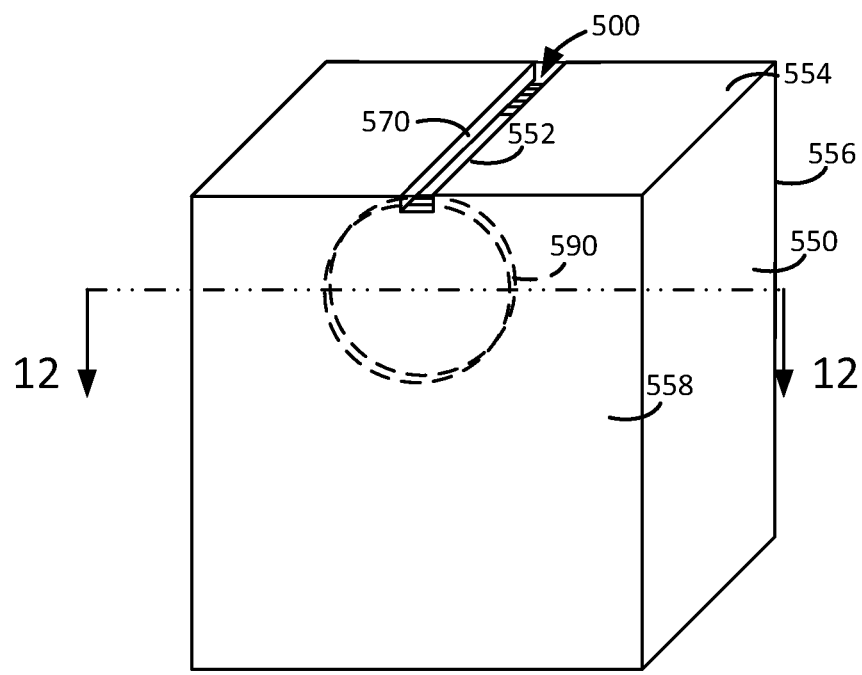
FIG. 11 is a rear perspective view of an antenna encased in a body having a ferrite disc according to an exemplary embodiment.
Figure 12:
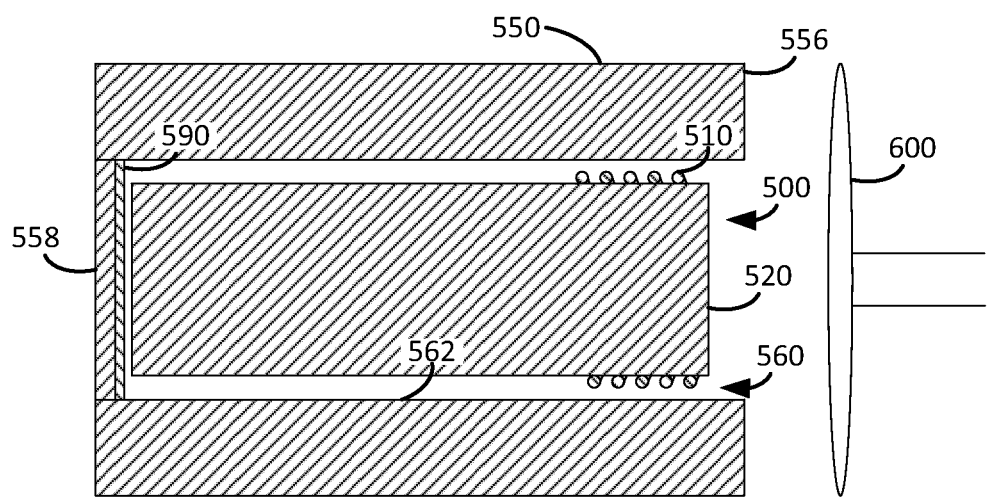
FIG. 12 is a cross-sectional view of the antenna encased in the body shown in FIG. 11 taken along line 12-12 and showing an example RFID or NFC device according to an exemplary embodiment.

In some implementations, such as that shown in FIGS. 11-12, the cylindrical opening may not extend all the way through the body. For instance, FIG. 11 depicts a rear perspective view of a body 550 having an antenna 500 within a longitudinal cylindrical opening 560, shown in FIG. 12, formed in body 550. Body 550 and/or antenna 500 may be constructed in accordance with at least some of the teachings of bodies 250, 350, 450 and/or antennas 200, 300. For example, as shown in FIG. 12, antenna 500 may include a primary coil 510 coiled around a nonconductive cylinder 520, though this is merely optional. In some instances, primary coil 510 may be positioned near front face 556. For example, a front end of primary coil 510 may be positioned coplanar to front face 556, 3/4 inch from front face 556, 3/8 inch from front face 556, and/or at any other point in relation to front face 556. Primary coil 510 may alternatively be positioned near rear face 558, at a mid point between front face 556 and rear face 558, and/or at any other point between front face 556 and rear face 558. Referring back to FIG. 11, body 550 includes a longitudinal slot 552 formed in a top surface 554 of body 550. Longitudinal slot 552 is positioned tangentially along cylindrical opening 560 and extends substantially along the length of cylindrical opening 560 from a front face 556 to a rear face 558 of body 550. The mutual inductance between a primary coil 510 of antenna 500 and an interior surface 562 of body 550, shown in FIG. 12, permits RF current to be induced on interior surface 562 due to the skin effect. The induced RF current on interior surface 562 permits an RF voltage to exist across longitudinal slot 552.

Rear face 558 may help shield primary coil 510 against metallic objects or other sources of stray capacitance that may detune primary coil 510, but rear face 558 may partially short the secondary coil formed by interior surface 562. In the present example, a ferrite disc 590 or other high-impedance buffer material is positioned between primary coil 510 of antenna 500 and rear face 558 of body 550. Ferrite disc 590 may add impedance to compensate for lost voltage due to the rear face 558 partially shorting the circuit of the interior surface and longitudinal slot 552. In some instances, ferrite disc 590 may result in 2-3 dB of recovered power when measured by an H field measurement probe. Ferrite disc 590 may also be omitted in some implementations. For example, ferrite disc 590 may be omitted in instances where primary coil 510 of antenna 500 has a sufficiently large diameter. However, when primary coil 510 has a relatively small diameter, ferrite disc 590 may be useful to achieve a desired efficiency. The RF voltage across longitudinal slot 552 generates an RF current on the exterior of body 550 to generate a magnetic field that communicates with an RFID or NFC device, such as device 600 (shown as a reference loop) of FIG. 12, near body 550. It should be understood that a vertical slot, such as vertical slot 480 of FIG. 10 may also be included on front face 556 of body 550. In some instances, a nonconductive, durable material 570, such as a potting material, may be used to fill in longitudinal slot 552, the cylindrical opening, and/or a vertical slot to enclose antenna 500 and/or other components within body 550.

In some embodiments, positioning windings of the primary coil (e.g., primary coil 510) very near to the inside surface of the body (e.g., inside surface 562) may provide a most efficient coupling from the windings to the interior wall. Efficiency may degrade as the diameter of the coil is reduced and/or the spacing between the coil and the interior wall increases. As the diameter of the coil is increased, the performance of the device may increase.

The foregoing examples of embedded antennas may be implemented into lock 10 of FIG. 1, though this is merely optional. It should be understood that the foregoing antennas may alternatively be implemented into other metallic, conductive bodies as well.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media (e.g., tangible and/or non-transitory) for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, flash memory, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A locking device comprising:
   an antenna; and
   a conductive body having a cavity disposed around the antenna and formed in an interior portion of the conductive body, wherein the conductive body further comprises a slot extending from the cavity to an outer surface of the conductive body;
   wherein the antenna is disposed about a non-conductive body, and wherein the conductive body has a complementary cross-section to a cross-section of the non-conductive body.

2. The locking device of claim 1, wherein the cavity is substantially cylindrical.

3. The locking device of claim 1, wherein the cavity is octagonal.

4. The locking device of claim 1, wherein the cavity has a square cross-section.

5. The locking device of claim 1, wherein the cavity has a rectangular cross-section.

6. The locking device of claim 1, wherein the cavity has a symmetrical cross-section.

7. The locking device of claim 1, wherein the cavity has an asymmetrical cross-section.

8. The locking device of claim 1, wherein the cavity has one or more sides.

9. The locking device of claim 1, wherein the cavity has a complementary cross-section to a cross-section of the antenna.

10. An electronic lock comprising:
    a lock assembly;
    a detection system associated with the lock assembly, the detection system comprising:
      a processing circuit, and
      a detection circuit having an antenna,
      wherein the detection system is operable to actuate the lock assembly in response to data from the processing circuit representative of an authorized access; and
    a body comprising:
      a conductive body disposed about the antenna, wherein the conductive body comprises a longitudinal slot extending along at least a portion of the conductive body, and
      a front conductive portion having a vertical slot, wherein the front conductive portion is in electrical communication with the conductive body and wherein the vertical slot and the longitudinal slot are substantially coplanar;
    wherein the antenna is disposed about a non-conductive body, and wherein the conductive body has a complementary cross-section to a cross-section of the non-conductive body.

11. The electronic lock of claim 10, wherein the conductive body is substantially cylindrical.

12. The electronic lock of claim 10, wherein the conductive body has a symmetrical cross-section.

13. The electronic lock of claim 10, wherein the conductive body has a complementary cross-section to a cross-section of the antenna.

14. A detection assembly comprising:
    a detection system comprising an antenna; and
    a body comprising:
      a conductive body disposed about the antenna, wherein the conductive body comprises a longitudinal slot extending along at least a portion of the conductive body, and
      a front conductive portion having a vertical slot, wherein the front conductive portion is in electrical communication with the conductive body and wherein the vertical slot and the longitudinal slot are substantially coplanar;
    wherein an RF current is generated about the vertical slot when the antenna disposed within the conductive body emits an RF signal; and
    wherein the antenna is disposed about a non-conductive body, and wherein the conductive body has a complementary cross-section to a cross-section of the non-conductive body.

15. The detection assembly of claim 14, wherein the conductive body is substantially cylindrical.

16. The detection assembly of claim 14, wherein the conductive body has a symmetrical cross-section.

17. The detection assembly of claim 14, wherein the conductive body has a complementary cross-section to a cross-section of the antenna.

18. The detection assembly of claim 14, wherein the conductive body is in communication with a ferrite portion.

19. The detection assembly of claim 14, wherein the vertical slot or the horizontal slot are filled with a non-conductive material.

20. The detection assembly of claim 14, wherein the detection system is operable to detect at least one of an RFID and NFC device.

21. An electronic lock comprising:
a lock assembly;
a detection system associated with the lock assembly, the detection system comprising an antenna, wherein the detection system is operable to detect at least one of an RFID and an NFC device, wherein the detection system is operable to actuate the lock assembly in response to a detection of at least one of an authorized RFID and an authorized NFC device; and
a body comprising:
   a substantially cylindrical conductive body disposed about the antenna, wherein the substantially cylindrical conductive body comprises a longitudinal slot extending along at least a portion of the substantially cylindrical conductive body, and
   a front conductive portion having a vertical slot, wherein the front conductive portion is in electrical communication with the substantially cylindrical conductive body and wherein the vertical slot and the longitudinal slot are substantially coplanar,
wherein the antenna and the at least one of the RFID device and NFC device are in communication via an RF current generated about the vertical slot; and
wherein the antenna is disposed about a non-conductive body, and wherein the substantially cylindrical conductive body has a complementary cross-section to a cross-section of the non-conductive body.

* * * * *